May 2, 1933.    L. E. SIPE    1,907,272
AUTOMATIC FISHING REEL
Filed May 14, 1931    2 Sheets-Sheet 1
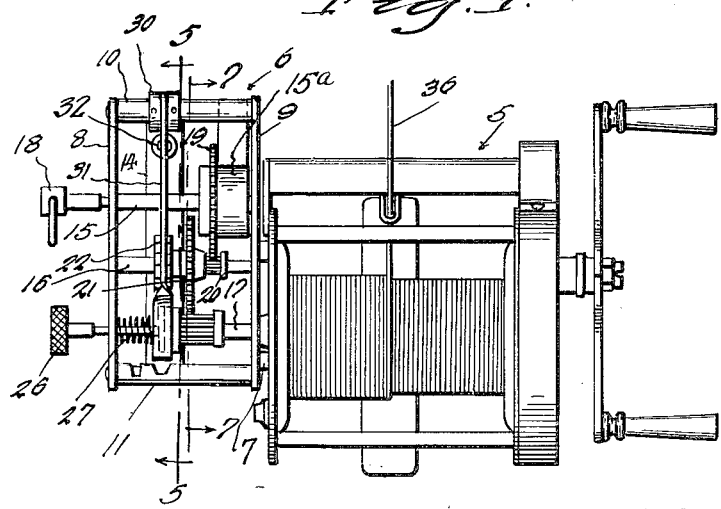
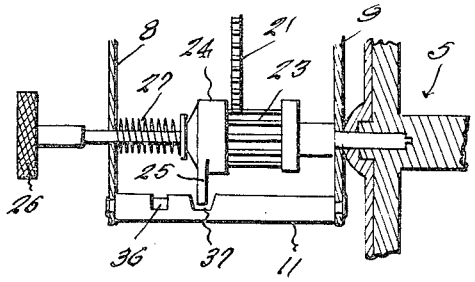
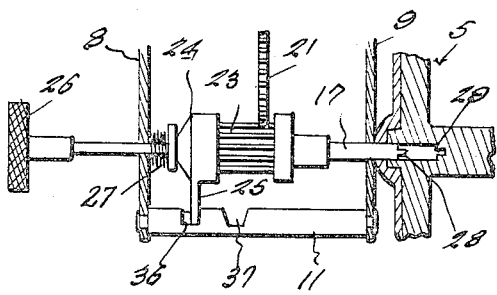
Inventor
Luther E. Sipe
By Clarence A. O'Brien
Attorney May 2, 1933.  L. E. SIPE  1,907,272
AUTOMATIC FISHING REEL
Filed May 14, 1931   2 Sheets-Sheet 2

Inventor
Luther E. Sipe
By Clarence A. O'Brien
Attorney

Patented May 2, 1933

1,907,272

UNITED STATES PATENT OFFICE

LUTHER E. SIPE, OF CONOVER, NORTH CAROLINA

AUTOMATIC FISHING REEL

Application filed May 14, 1931. Serial No. 537,389.

This invention relates generally to automatic fishing line reels, and particularly to a fishing reel to be used in connection with a fishing pole or with a stationary support, whereby to perform the operation of reeling and unreeling of the fishing line when a fish has been caught upon the line, entirely without attention from a fisherman, and particularly to a device of this character of novel simplicity and effectiveness, possessing the features of advantage and invention which will be more clearly perceived as the description of the device proceeds below.

It is an object of this invention to provide an attachment for a regulation fishing reel, whereby to operate the reel without attention from a fisherman employing the same in fishing.

It is also an object of this invention to provide an easily installed, simple and inexpensive attachment of this character which, while in position upon a reel, may be connected or disconnected from operative relation therewith in a simple and quick manner.

These and other objects of the invention, its nature, and its composition and arrangement and combination of parts will be readily understood by anyone acquainted with the art to which this invention relates upon consulting the following descriptions of the drawings, in which:—

Figure 1 is a general side elevational view of a conventional fishing reel having mounted thereon a device in accordance with my invention.

Figure 3 is a cross sectional view taken on the line 3—3 through the upper right hand portion of Figure 2.

Figure 4 is a view similar to Figure 3 showing the operative connection of the attachment disengaged from the reel.

Figure 7 is a sectional view taken approximately on the line 7—7 of Figure 1 looking in the direction of the arrows.

Figure 5:
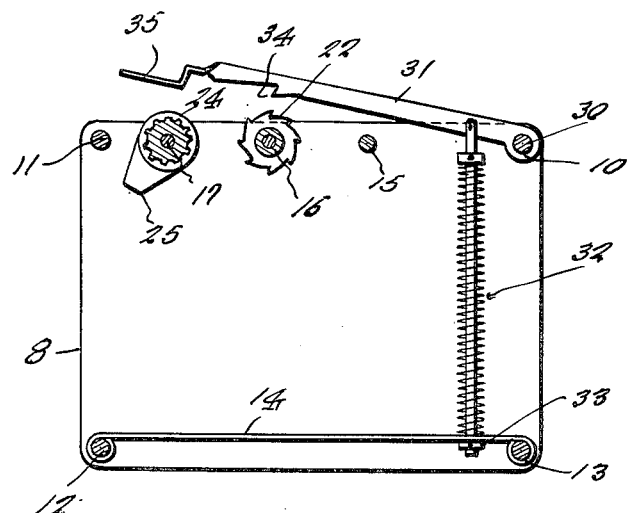
Figure 5 is a sectional view taken approximately on the line 5—5 of Figure 1 looking in the direction of the arrows.

Referring in detail to the drawings, the numeral 5 generally designates a conventional type of fishing reel, and to the side thereof opposite the handles the spring motor attachment generally designated 6 is attached by means indicated at 7. The automatic spring motor attachment generally designated 6 is composed of a pair of side plates 8 and 9, parallelly spaced by sleeves or spacers 10, 11, 12 and 13, at the corners of the plates 8 and 9. Between the spacers 12 and 13 there is stretched a thin band or strip 14, seen in Figures 5 and 1. Axles 15, 16 and 17 are journaled in and between the plates 8 and 9. The axle 15 carries a conventional ratchet mounted spring rotor 15a adapted to be wound by a finger piece 18 on the outer end of the axle 15. The rotor carries the toothed wheel 19. The toothed wheel 19 engages with a suitable toothed wheel or the like 20 carried upon the axle 16. The axle 16 carries also, outwardly of the wheel 20, a large toothed wheel 21 and outwardly of the wheel 21 a ratchet wheel 22. The large toothed wheel 21 engages with an elongated gear or toothed drum 23 on the axle 17. On the outward end of the toothed drum 23 is a circular or cylindrical enlargement 24 which has a lateral generally triangular finger 25 for a purpose to be described. The axle 17 is provided to be longitudinally moved by drawing upon the knurled finger piece 26 against the tension of a coiled spring 27 on the axle 17 between the enlargement 24 and the plate 8. The inward end of the axle 17 is provided with a projection or the like 28 for engaging a co-related depression or recess 29 in the main axle of the reel 5. The spring 27 operates normally to position the projection 28 therein, whereby to connect for rotation the axle 17 and the reel 5. In the retracted position shown in Figure 4 the axle 17 is disconnected from operative connection with the reel, and the reel may then be used independently of the spring motor attachment and in the manner of an ordinary reel.

Figure 6:
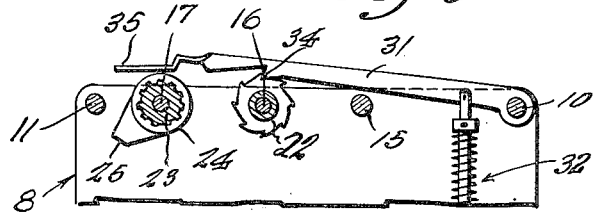
Figure 6 shows the spring operated pawl of Figure 5 in another position.
Figure 2:
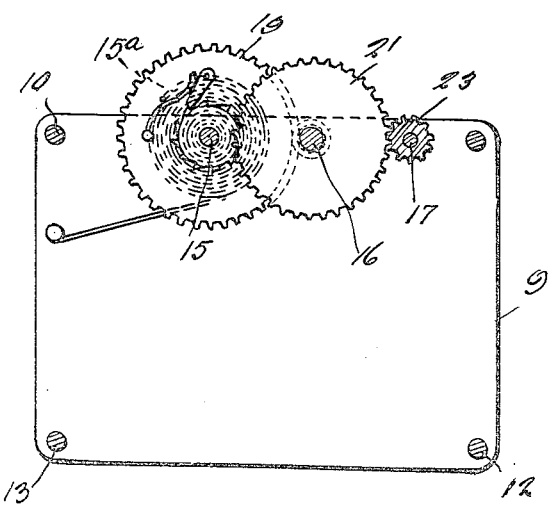
Figure 2 is a plan view taken from the left of Figure 1.

Pivoted on the spacer 10 as at 30 is a pawl 31 downwardly urged by a coil spring structure generally designated 32 which is connected to the strip 14 at 33. The pawl 31 has a tooth or finger 34 for engaging the teeth of the ratchet wheel 22 on the axle 16, and a downwardly and longitudinally extended portion 35 adapted to be engaged by the finger 25 carried by the shaft or axle 17. Reference to Figure 6 will disclose the normal positioning of the pawl 31, namely, with the tooth 34 engaging the ratchet wheel 22 and the bent portion 35 engaging the circular portion of the enlargement 24 of the drum 23. By a pull on the fishing line 36, such as would occur in case of a fish being caught on the hook of the line, the rotor of the reel 5 will be suddenly moved so as to rotate the shaft or axle 17, with consequent turning of the finger 25 into the path of the pawl 31. In this action the finger 25 strikes and raises the portion 35 of the pawl and consequently the pawl itself, and disengages the pawl from the ratchet wheel 22, and said disengagement permits the spring rotor 15a to unwind itself, and thereby rotate the rotor of the reel 5 in a direction opposite to that initiated by the mentioned pull, thus taking up any slack in the line. A strong pull on the line will only cause a tighter winding of the spring rotor 15a, and renew its motor force when some slack again occurs in the line, thereby providing for reeling in an exhausted fish or one that is not struggling strongly while permitting at the same time a certain amount of lee-way for a strong fish to travel or run with the hook. Of course, upon the exhaustion of a strong fish, due to the constant maintenance of the line in a taut condition, the fish will be properly reeled in. It will be noticed that all of these operations are accomplished entirely automatically and without attention from an operator.

When it is desired to disconnect the operative connection of the attachment with the reel itself, the knurled knob 26 is drawn outwardly against the tension of the spring 27, and the shaft 17 rotates so that the finger 25 is placed in the notch 36 in the spacer 11 whereby to maintain the shaft 17 against being pulled inwardly by the tension of said spring. A notch 37 inwardly of the notch 36 in the spacer 11 provides proper clearance for the finger 25 when the shaft 17 is in the inward position.

It is to be definitely understood that I do not desire to limit the application of this invention to the particular modification set out herein in order to illustrate the principles thereof, and any change or changes may be made in material and structure and arrangement of parts consistent with the spirit and scope of the invention as claimed.

What is claimed is:—

1. An automatic fishing device for a fishing reel comprising a frame attachable to one side of the reel, a spring motor on the frame, a separable operative connection between the motor and the reel, and means associated with the motor and operable by the reel to release the motor into operation for operating the reel.

2. An automatic attachment for a fishing reel, comprising a frame mountable on one end of the reel, a spring motor on the frame, a separable operative connection between the motor and the reel, a gear train connecting the motor and said operative connection, and pawl means on the frame for releasable cooperation with the gear train, and said pawl being releasable by rotation of the reel by a pull on an associated fishing line so as to actuate the reel by the motor.

3. The combination with a conventional fishing reel of a frame detachably secured to one end of the reel, a shiftable rotatable element carried by the frame normally in operative engagement with the axle of the reel and adapted to be shifted into and out of such operative engagement, a spring motor for driving the rotatable element, releasable detent means normally engaged with the spring motor to maintain the spring motor against operation, said releasable detent being adapted to be released by an unreeling rotation of the reel axle whereby said spring motor is conditioned to rotate said reel axle for reeling a line upon the reel.

4. The combination with a conventional fishing reel of a frame detachably secured to one end of the reel, a shiftable rotatable element carried by the frame normally in operative engagement with the axle of the reel and adapted to be shifted into and out of such operative engagement, a spring motor for driving the rotatable element, releasable detent means normally engaged with the spring motor to maintain the spring motor against operation, said releasable detent being adapted to be released by an unreeling rotation of the reel axle whereby said spring motor is conditioned to rotate said reel axle for reeling a line upon the reel, said shiftable rotatable element being located axially aligned with the reel axle.

5. The combination with a conventional fishing reel of a frame detachably secured to one end of the reel, a shiftable rotatable element carried by the frame normally in operative engagement with the axle of the reel and adapted to be shifted into and out of such operative engagement, a spring motor for driving the rotatable element, releasable detent means normally engaged with the spring motor to maintain the spring motor against operation, said releasable detent being adapted to be released by an unreeling rotation of the reel axle whereby said spring motor is conditioned to rotate said reel axle for reeling a line upon the reel, said shiftable rotatable element being located axially aligned with the reel axle, and locking means carried by the rotatable element and cooperable with the frame permitting locking the rotatable element out of operative engagement, so that the action of the reel may be independent of the axle.

In testimony whereof I affix my signature.

LUTHER E. SIPE.